March 6, 1956 P. E. MORGAN ET AL 2,737,390
AUTOMATIC STACKING DEVICES
Filed Oct. 12, 1951 11 Sheets-Sheet 1

Inventors
Paul E. Morgan
Arthur R. Abbott
John J. Maciejowski
By their Attorney
Thomas J. Ryan

Fig. 3

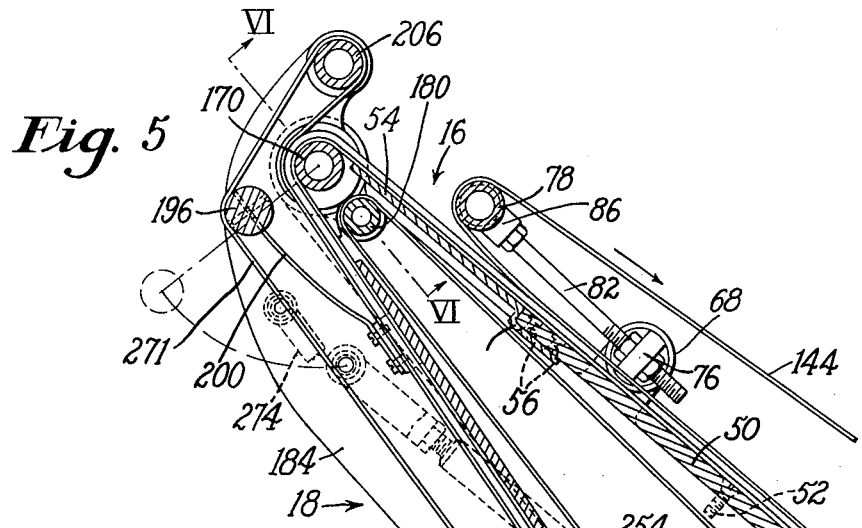
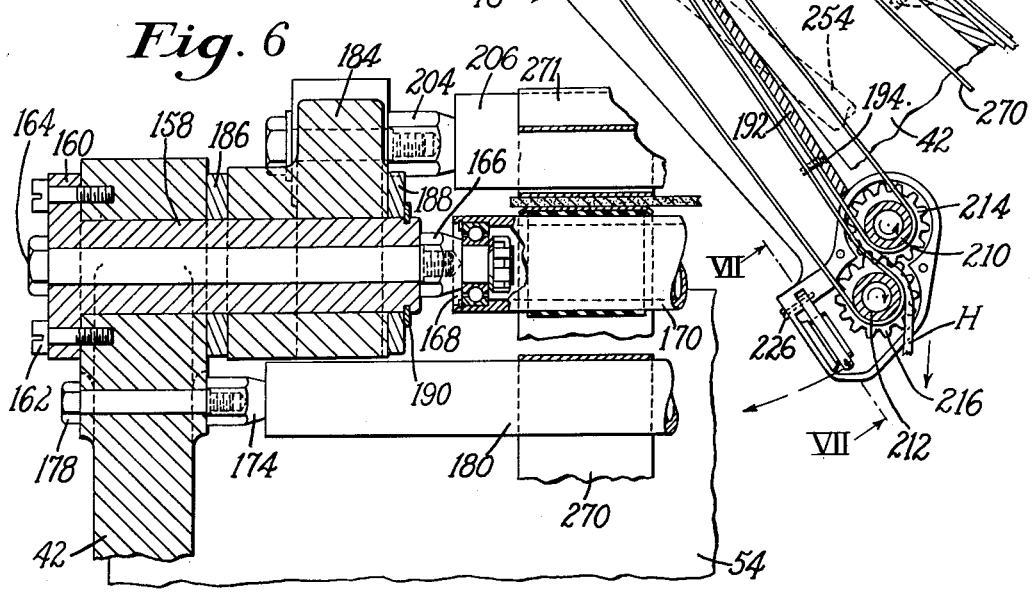
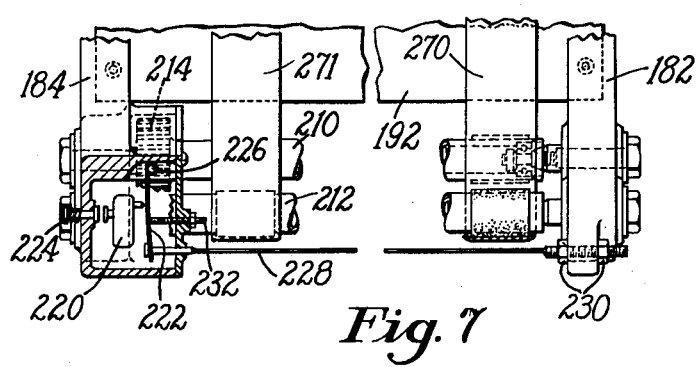

March 6, 1956  P. E. MORGAN ET AL  2,737,390
AUTOMATIC STACKING DEVICES
Filed Oct. 12, 1951  11 Sheets-Sheet 5
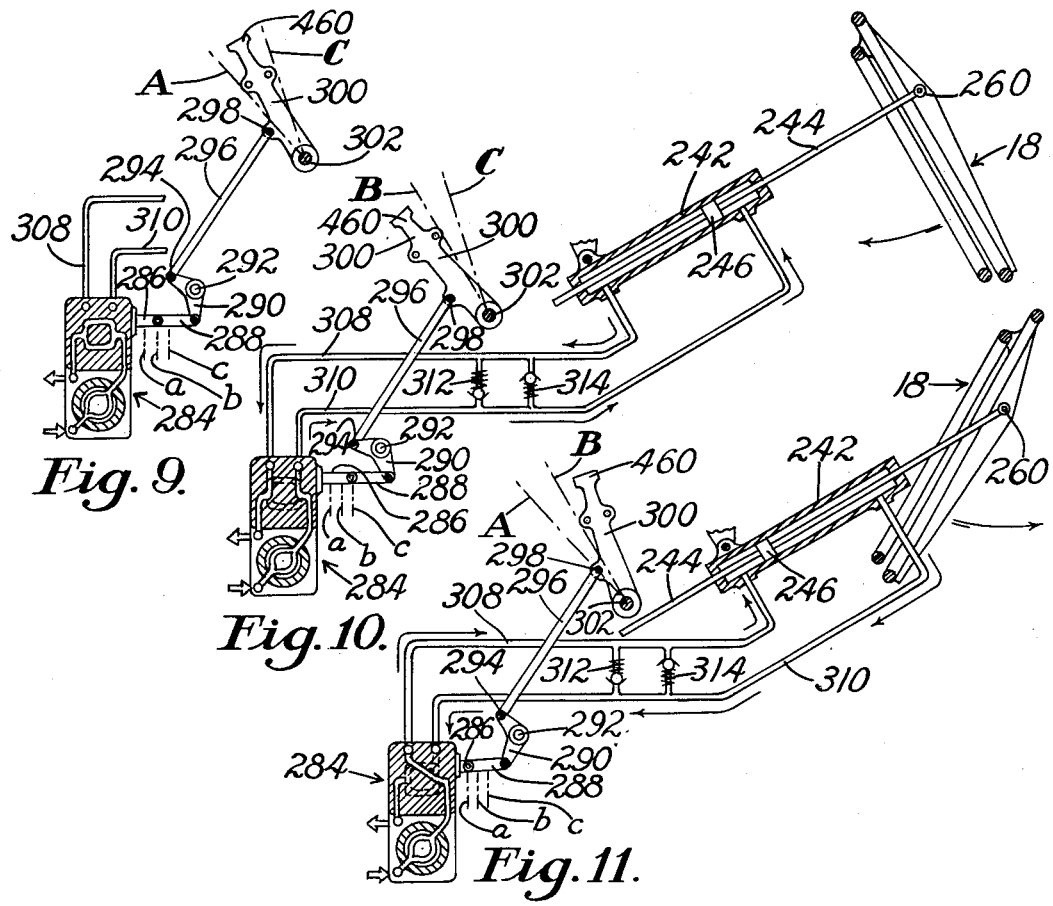
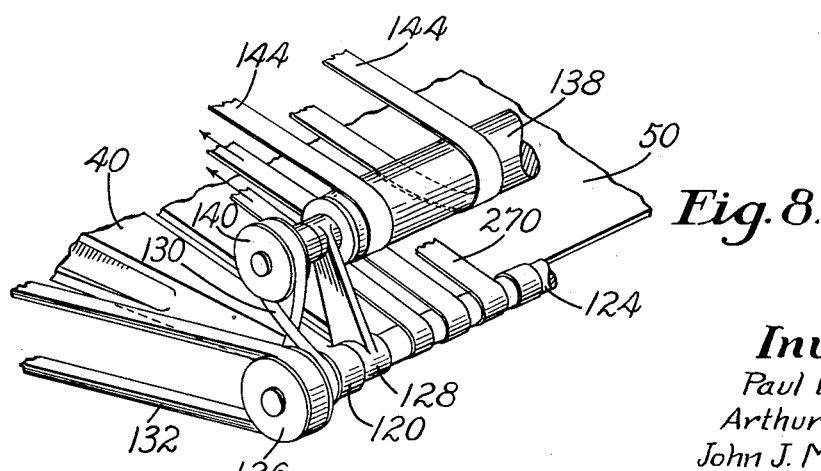
*Inventors*
Paul E. Morgan
Arthur R. Abbott
John J. Maciejowski
By their Attorney
Thomas J. Ryan Inventors
Paul E. Morgan
Arthur R. Abbott
John J. Maciejowski
By their Attorney
Thomas J. Ryan

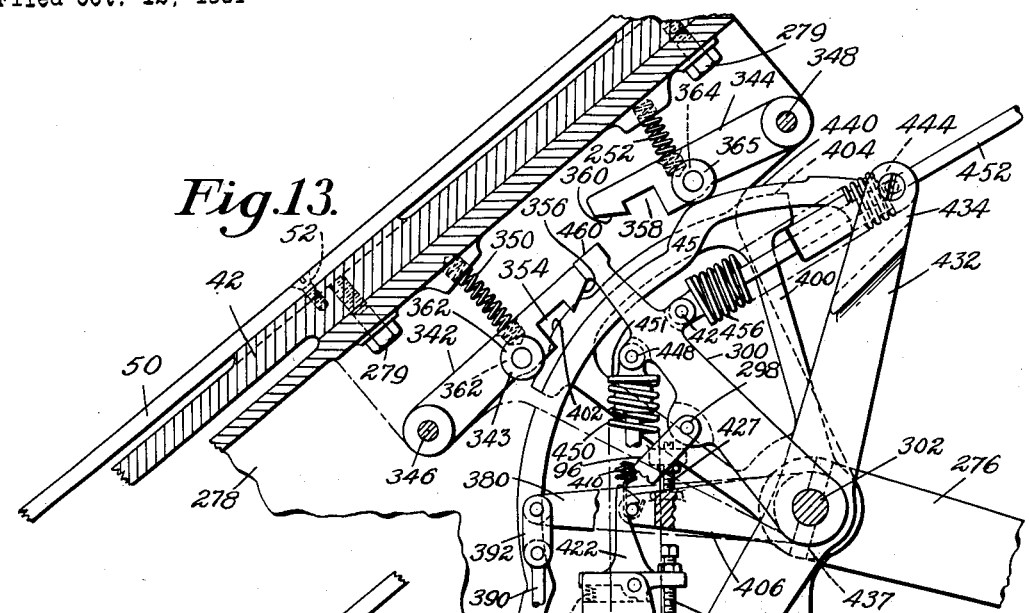

March 6, 1956  P. E. MORGAN ET AL  2,737,390
AUTOMATIC STACKING DEVICES
Filed Oct. 12, 1951  11 Sheets-Sheet 8
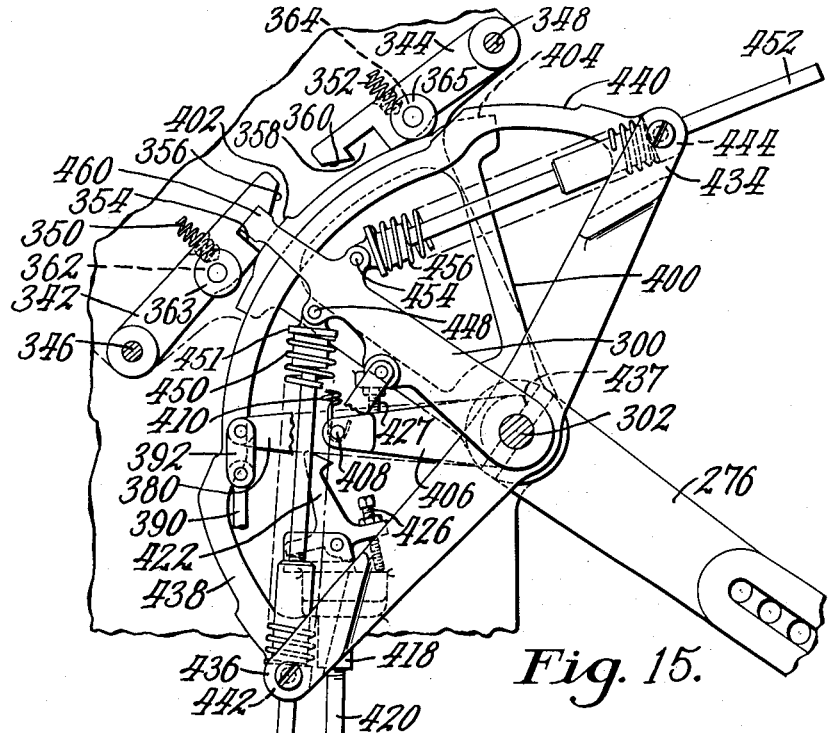
Fig. 15.
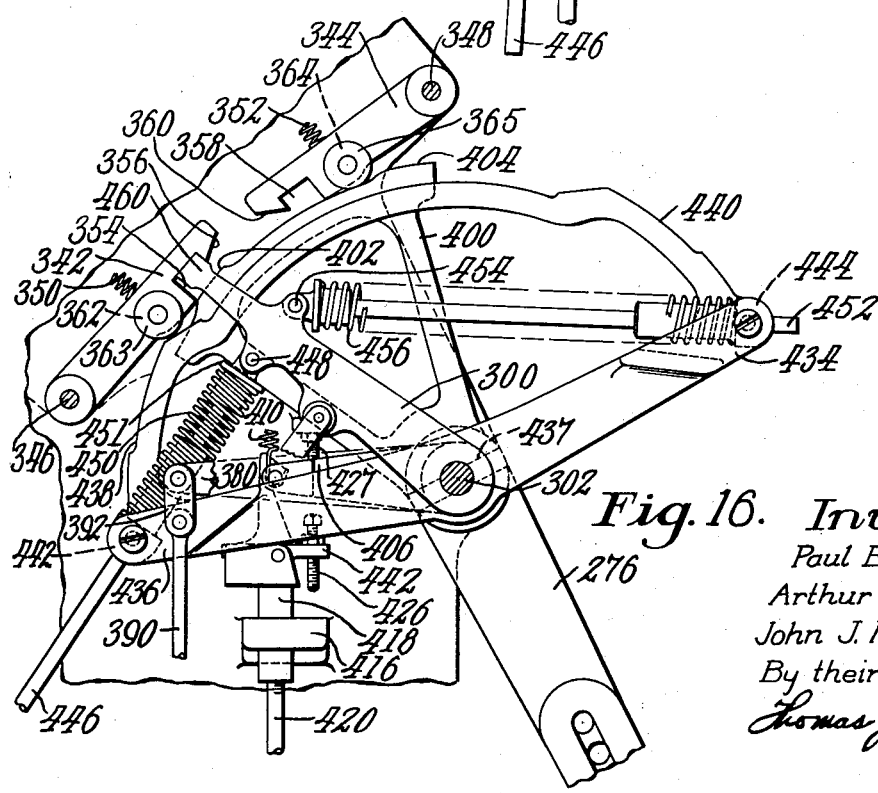
Fig. 16.  Inventors
Paul E. Morgan
Arthur R. Abbott
John J. Maciejowski
By their Attorney
Thomas J. Ryan

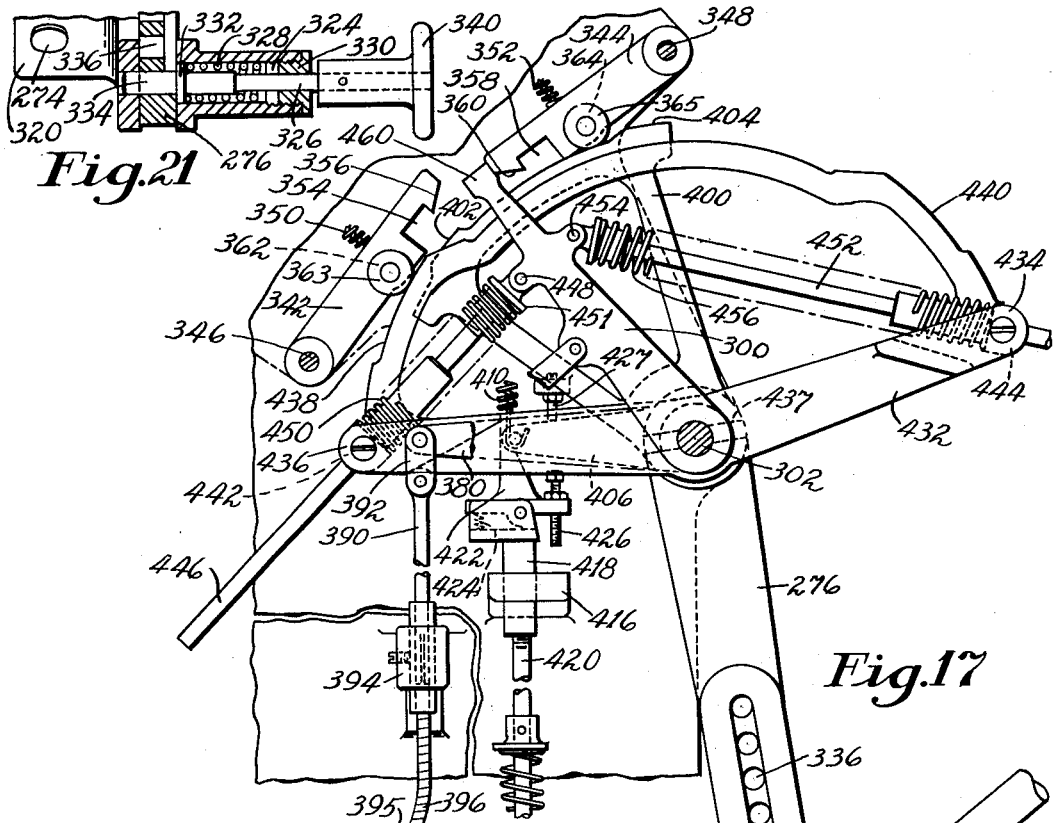

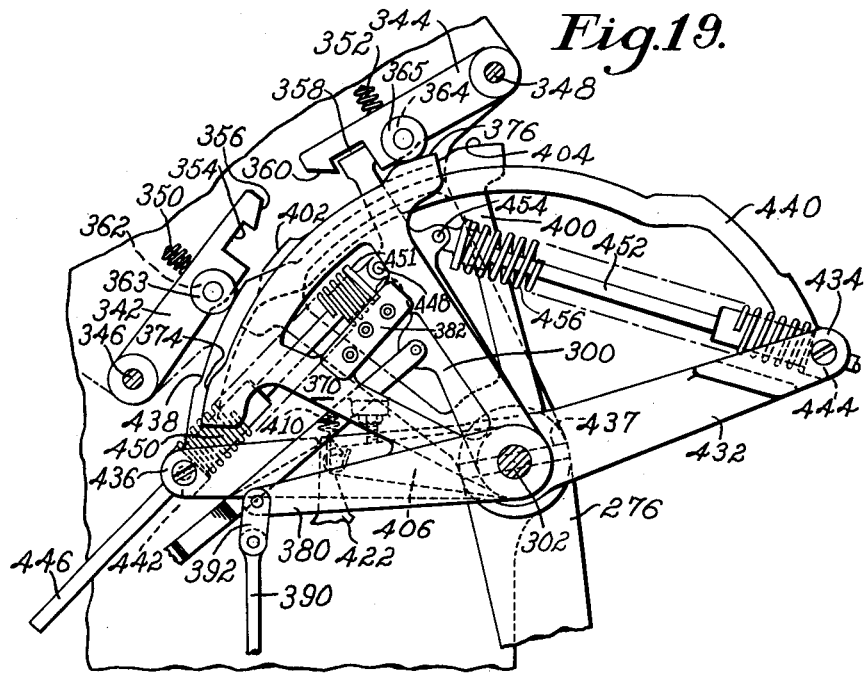
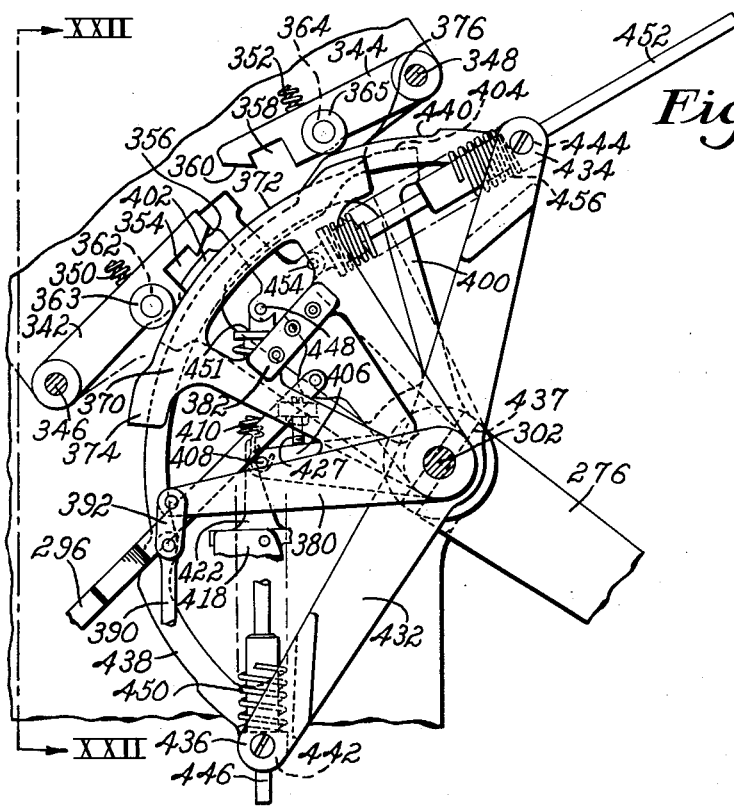

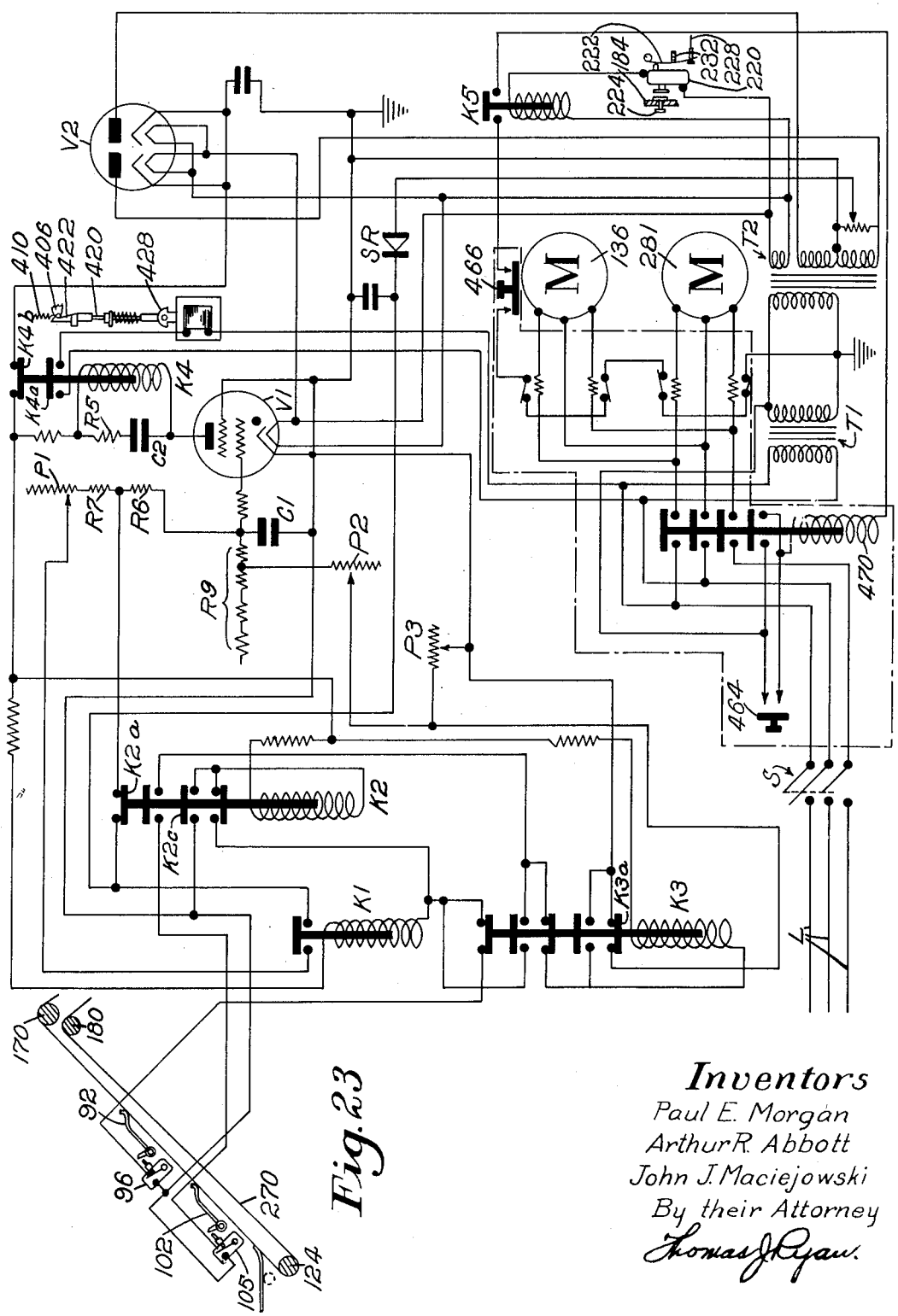

United States Patent Office 2,737,390
Patented Mar. 6, 1956

2,737,390

AUTOMATIC STACKING DEVICES

Paul E. Morgan, Melrose, Arthur R. Abbott, Beverly, and John J. Maciejowski, Wenham, Mass., assignors to United Shoe Machinery Corporation, Flemington, N. J., a corporation of New Jersey Application October 12, 1951, Serial No. 251,014

12 Claims. (Cl. 271—68)

This invention relates to machines for stacking individual and spread-out flexible work pieces, and more particularly to machines for stacking hides or skins as they are consecutively presented either manually or mechanically.

In a tannery, hides and skins must be stacked and temporarily stored between various work treating operations. Extensive manipulation in stacking, if manually undertaken, consumes much labor and time because of the unwieldy nature of the work. Manual handling of whole hides or sides is particularly difficult because of the weight and length of each work piece and great care must be exercised in stacking some types of work to eliminate creases and wrinkles which would adversely affect the quality of the ultimate product.

Calfskins are usually stacked in a "Standard" manner, i. e., each piece is received with a given side up and is deposited with that same side up.

"Invert" stacking is often resorted to in which case each work piece is received with one side up and is stacked or deposited with that side down.

Another type of stacking is called "Marrying" in which alternate pieces are stacked grain side up and the other pieces with the flesh side up.

In "Doubled" stacking, long pieces of work are doubled over without folding or creasing and the stacking is usually reversed several times for a given stack to maintain stack balance (the looped or doubled-over portions of the skins are first deposited on one side of the stack and then on the opposite side).

A versatile machine for accomplishing any one of the above forms of stacking has been disclosed in United States Letters Patent No. 2,686,673, granted August 17, 1954, in the name of Paul E. Morgan. Such a machine has proved to be surprisingly effective but costly and the necessary acceleration and deceleration imparted to a considerable number of parts of the machine leave much to be desired in so far as smoothness of operation is concerned.

It has now been discovered that proper deposition of each work piece on a floor, pallet or horse does not require a straight-line motion for the discharge end of the work delivery system providing the machine cycle is timed properly to drop the center of each work piece at the proper location and the vertical distance between the discharge end of the system and the stack is not too great for the type of work being handled. It has also been found that the swinging or oscillating of the work discharge end of the delivery system in an arc results in a much smoother and better controlled stacking operation and that it is possible to provide means giving excellent timing for carrying out each machine cycle.

It is an object of the present invention to provide an improved machine which will stack individual sheets of material such as hides or skins as they are consecutively presented. It is also an object to provide a machine which will operate smoothly and without jarring and with accuracy of control whether the desired stacking operation be in the Standard, Invert, Marry or Doubled form.

In accordance with an important feature of the invention a novel work delivery system is provided which leads from the front or work-receiving side of the machine and includes at least one endless conveyor belt and preferably a multiplicity of such belts constrained into an inverted V-form with the work discharge end of the system arranged to oscillate in an arc over a work deposit zone to the rear or at the opposite side of the machine.

Another feature comprises a delivery system with a multiplicity of endless conveyor belts with parallel and contiguous runs for effectively guiding and positively controlling each work piece by contacting both sides thereof substantially the full length of the system.

Still another feature is a novel cam-operated control mechanism for determining the timing of the cycle of the machine operation in accordance with the selected form of stacking.

Another feature of the invention is a safety mechanism arranged to terminate the operation of the stacker when a work receiving zone has become as fully occupied as desired by previously delivered work.

The above and other features of the invention will now be more particularly described with reference to the accompanying drawings and pointed out in the claims.

In the drawings,

Fig. 3 is a view looking in the direction of the arrow III in Fig. 1 depicting the work handling belts and a work piece as conveyed by the belts;

Fig. 4 is a view as seen in the direction of the arrow IV in Fig. 1, parts of the right-hand side only of the machine being shown;

Fig. 5 is a sectional view drawn to an enlarged scale and taken along the line V—V of Fig. 3 but with the work discharging end of the conveyor system being in the inward position—i. e.—being swung toward the front or work receiving side of the machine;

Fig. 6 is a sectional view drawn to an enlarged scale along the line VI—VI of Fig. 5 showing details of construction at one side of the machine;

Fig. 7 is a detail view partially sectioned along the line VII—VII of Fig. 5 with intermediate portions omitted;

Fig. 8 is a perspective view of a portion of the belt conveyor system shown in Fig. 3;

Fig. 9 is a diagrammatic view of control elements in a neutral or non-driving position in so far as the oscillating or swinging of the discharge end of the conveyer system is concerned;

Figs. 10 and 11 are diagrammatic views of the discharge end of the conveyor system moving inward and outward respectively and with the valve control arm of Fig. 9 appropriately positioned;

Figure 22:
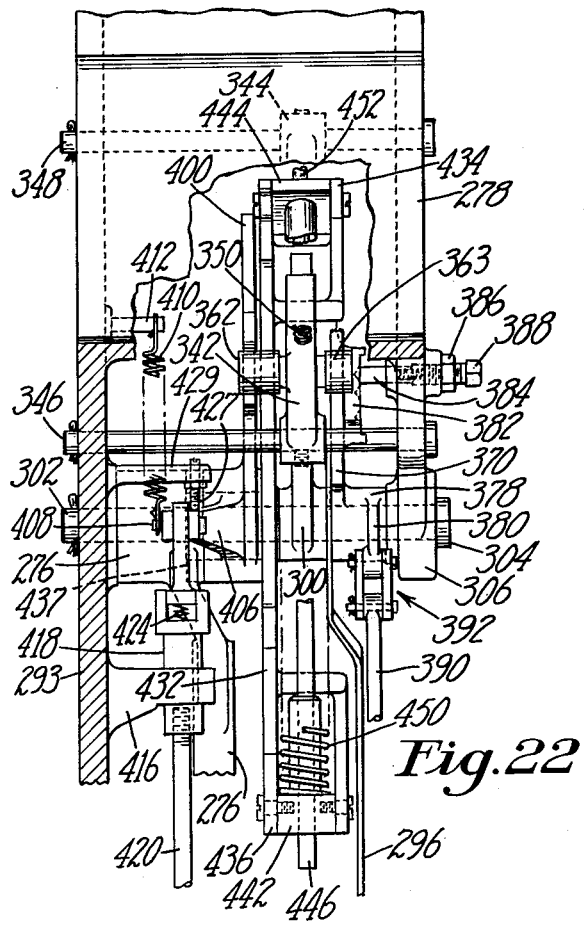

Figs. 13 to 20 inclusive show control elements in positions assumed during various stages of the machine operation, one segmental cam being omitted from Figs. 13 to 17 inclusive in the interest of clarity;

Fig. 21 is a sectional view along the line XXI—XXI of Fig. 17;

Fig. 22 is a sectional view along the line XXII—XXII of Fig. 20; and

Fig. 23 is a diagram of the electrical system by means of which the operation of the machine is automatically controlled.

Figure 1:
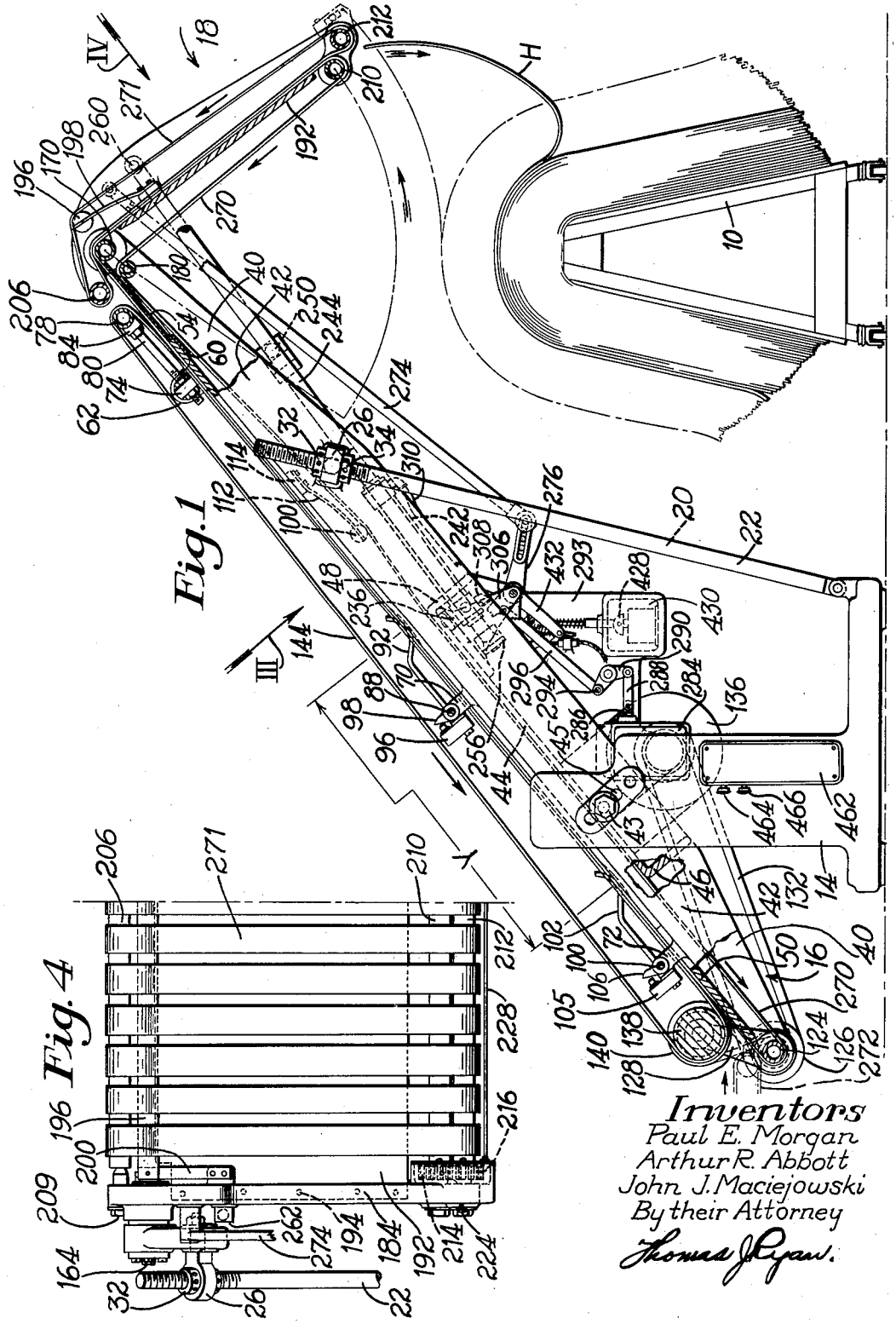
Fig. 1 is a view in elevation of the right-hand side of a machine in which the present invention is embodied, with portons of the machine removed for clarity of illustration, the discharge end of the conveyor system being shown as swung outwardly and above a support arranged to receive work as discharged from the machine.
Figure 2:
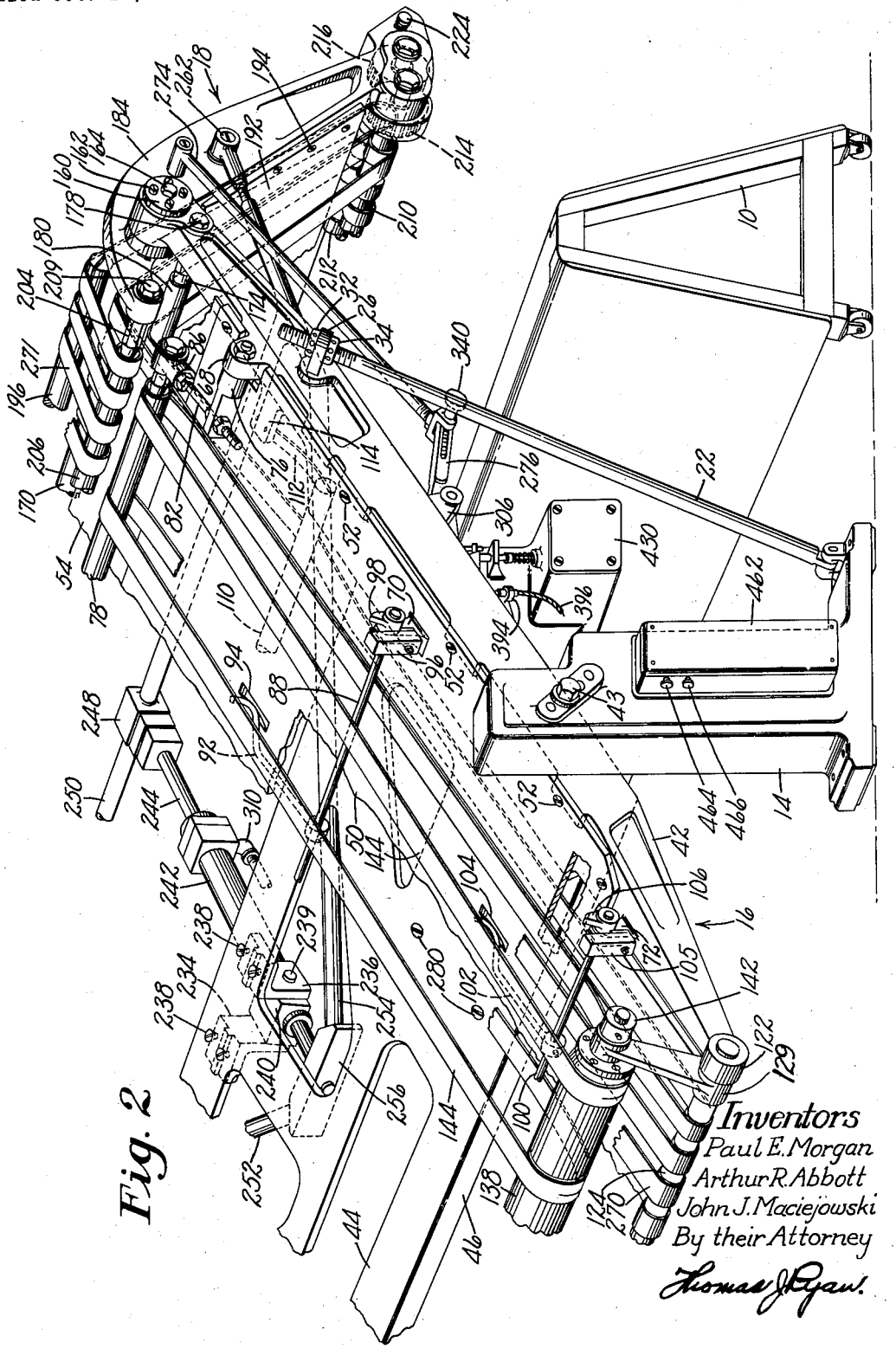
Fig. 2 is a perspective view of the right-hand portion of the machine, some parts being omitted, and the work receiving support or horse in operative position.

The machine is adapted to deposit or stack consecutively presented work pieces. The work pieces may be stacked upon the floor which supports the machine but preferably some means is provided to receive the work pieces such as a table, a pallet or a horse 10 (Figs. 1 and 2). The stack support or horse does not form a part of the present invention and is merely a suitable device upon which the work may be placed in an orderly pile by the stacking machine. In certain installations it may be found advisable to substitute a device which will lower as the stack or pile of work placed upon it is increased in height.

The machine in which the present invention is embodied comprises a frame having two vertical and cast end members 12 and 14 (Fig. 3), a main conveyor frame 16, a delivery arm 18, and two main supporting rods 20 and 22. The lower end of the rod 20 is pivoted to the base of the member 12 and the rod 22 is similarly pivoted to the member 14. The rods 20 and 22 serve to hold the main conveyor frame 16 in adjustable and angular relation with respect to the horizontal. The adjustment is made possible by the use of brackets 24 and 26 (Fig. 3) and collars 28, 30, 32 and 34. The collars are adjustable on the threaded upper ends of the rods 20 and 22 and engage the opposite sides of each of the two brackets 24 and 26, the latter being pivotally adjustable in positions on the frame 16 by virtue of studs 36 and 38 which are integral with the brackets and pass through side members 40 and 42 of the frame 16. Further support is given the frame 16 by bolts 41 and 43 (Fig. 3) which pass through the cast end members 12 and 14 respectively. Four holes 45 (Fig. 1) are provided in each casting 12 or 14 permitting further adjustment in position of the frame 16 by the relocation of the bolts 41 and 43. With the means referred to the main conveyor frame 16 may be adjusted to a suitable angle and the supplementary conveyor frame 18 may be placed with a height of work discharge desired for a given installation.

Figure 3:
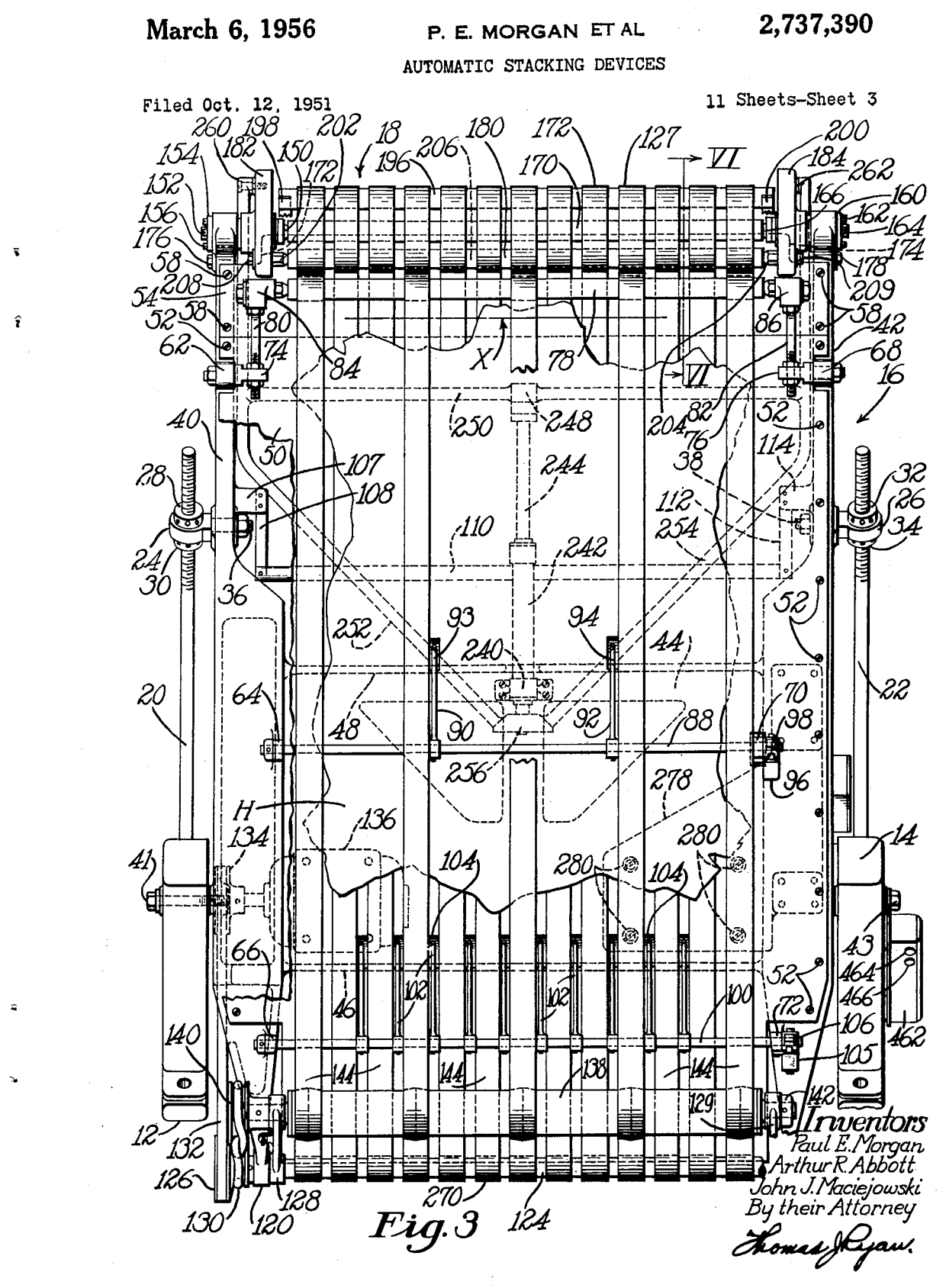

The side members 40 and 42 of the frame 16 are rigidly joined by a steel plate 44 having depending stiffening flanges 46 and 48 (Fig. 1). Supported slightly above and parallel with the plate 44 is a second plate 50 which is preferably made of plywood and is fixed to both side margins of the frame 16 by means of screws 52 (Fig. 3). Top and bottom end portions of the side members 40 and 42 of the frame 16 protrude beyond the plate or plywood 50. At the top of the machine, the frame 16 extends not only beyond the plywood 50 but also beyond a metal plate 54 attached to the underside of the plywood 50 by means of screws 56 (Fig. 5) and to the tops of the side members 40 and 42 by four screws 58 (Fig. 3). The top side of the plate 54 is placed in the same plane as the top side of the plywood 50 by forming the plate 54 with a suitable flange 60 (Fig. 5).

The upper surface of the side member 40 is provided with three upwardly extending projections 62, 64 and 66 and the side member 42 is also provided with three projections 68, 70 and 72. The two projections 62 and 68 (Fig. 3) are utilized as journals for two pivotal members 74 and 76 respectively and these two members in turn support a roller 78 by means of two rods 80 and 82 and ball-bearing carrying right angular members 84 and 86. The two projections 64 and 70 (Fig. 3) serve as journals for a detector rod 88 upon which two curved and spaced arms 90 and 92 are fixedly mounted. These two curved arms are so formed as to project in recesses 93 and 94 in the plywood 50. The projection 70 is so constructed as not only to serve as a journal for one end of the rod 88 but also as a means of support for a microswitch 96 which is adapted to be operated by a finger member 98 mounted on and pinned to the end of the rod 88. The two projections 66 and 72 (Fig. 3) serve as journals for a second detector rod 100 which in turn supports ten fingers 102 in fixed relation thereto. Each of these fingers 102 is curved and so placed as to extend within a shallow recess 104 (Fig. 2) in the plywood 50. The projection 72 is also adapted to support a microswitch 105 and a finger member 106 is fixed to the end of the rod 100 to operate the switch.

The inner side of the side member 40 (Fig. 3) is provided with a projection 107 to which is rigidly attached a flat spring member 108 on the end of which is carried one end of a bar 110. This bar 110 is placed below and in parallel relation with the plywood 50 and the other end of the bar 110 is supported on the end of a flat spring member 112 which in turn is rigidly affixed to a projection 114 which is integral with the side member 42.

The lower ends of the side members 40 and 42 are provided with journals 120, 122 respectively (Figs. 2 and 3) which rotatably support the ends of a roller 124 as well as a double pulley 126 and two swingable arms 128 and 129. The pulley 126 has two sheaves, one of which is arranged to drive a belt 130 and the other of which is arranged to be driven by a belt 132. The belt 132 is driven by a pulley 134 (Fig. 3) fixed to the shaft of a motor 136 which is mounted on the bottom of or suspended from the steel plate 44.

The ends of the arms 128, 129 rotatably support a roller 138 to one end of which is affixed a pulley 140 which is adapted to be driven by the belt 130 (Fig. 8). The other end of the roller 138 is provided with a collar 142 (Fig. 2) pinned thereto.

Five endless belts 144 are mounted on the rollers 78 and 138 for operation therewith. Both rollers are suitably crowned in order to retain the five belts 144 in properly spaced relation transverse to the machine frame and longitudinally of the rollers. The belts 144 are so arranged on their rollers that the lower runs thereof rest (in the absence of work) upon upper runs of co-operating belts as will further appear. Tension in the belts 144 may be adjusted by adjusting the rods 80 and 82 in a well known manner.

The upper end of the side member 40 is provided with a pivot pin 150 (Fig. 3) which is held in place by means of a bolt 152 passing through a cylindrical member having a flange 154. This flange is held in place on the member 40 by means of screws 156. The cylindrical member with the flange 154 is not clearly shown in the drawings but a similar cylindrical member 158 (on the opposite side of the machine) is clearly shown in Fig. 6 and this member has a flange 160 which is attached to the side member 42 by means of screws 162, and a bolt 164 which is similar to the bolt 152 is passed through the cylindrical member 158 to support a pivot pin 166 with a roller bearing assembly 168. The pivot pins 150 and 166 (Fig. 3) serve to support the opposite ends of a roller 170 in proper position on the main conveyor frame 16.

A second set of pivot pins 172 and 174 (only locations shown in Figs. 3 and 6 but Figs. 2 and 6 show the pin 174) are also supported on the side members 40 and 42 by means of bolts 176 and 178. These pivot pins, through the medium of roller bearings support the opposite ends of a roller 180.

The delivery arm 18 comprises two side members or arms 182 and 184 (Fig. 3), the latter member being journaled on the cylindrical member 158 (Fig. 6) with a washer 186 being interposed between the member 42 and the member 184. A second washer 188 is retained in place on the end of the member 158 by means of a spring washer 190. The side member 182 is similarly mounted for rotation with respect to the side member 40 of the main frame.

The two side members 182 and 184 of the delivery arm 18 are rigidly joined by means of a plate 192 (Figs. 1, 2, 4 and 5) which is attached thereto by means of screws 194.

A rod 196 is attached to projections on the inside of the side members 182 and 184 by means of yieldable flat spring members 198 and 200.

The upper ends of the side members 182 and 184 are curved toward the front of the machine and are provided with pivot pins 202 and 204 (Fig. 3) which, through the use of ball bearings, support a roller 206. The pins 202 and 204 are retained in their positions by bolts 208 and 209 respectively.

The lower ends of the arms or side members 182 and 184 serve as journals for two rollers 210 and 212 and the lower end of the arm or side member 184 is formed in the shape of a gear casing to enclose two meshing gears 214 and 216. The gears 214 and 216 are keyed to the rollers 210 and 212 respectively.

On the end of the side arm on side member 184 the gear casing is made of sufficient size to contain a microswitch 220 (Fig. 7) which is positioned to be tripped either by a spring member 222 pivoted to the casing or by a spring and outwardly biased plunger 224 projecting from the side of the gear casing. The spring member 222 is pivoted on a pin 226 and the opposite end of the spring member is attached to a wire element or work contacting means 228 which passes through the side of the gear casing and is held in rigid relation to the side member 182 by two lock nuts 230 (Fig. 7). An adjustable pin 232 is held in the gear casing and is placed in contact with the spring member 222.

Beneath the steel plate 44 of the main conveyor frame 16 are mounted two depending brackets 234 and 236 (Fig. 2) which are keyed to the plate and affixed thereto by means of screws 238. Journaled in the two brackets 234 and 236 are trunnions (one trunnion 239 being shown) upon which is pivotally mounted a block 240. The block 240 is an end portion of a power cylinder 242 through the longitudinal center of which a piston rod 244 is arranged to reciprocate by virtue of fluid pressure exerted on either side of a piston 246 (Figs. 10 and 11) affixed to the rod 244. The upper end of the piston rod 244 is affixed at 248 (Figs. 1 and 3) to a bar 250 which is a cross member in a yoke for actuating the supplementary conveyor frame 18. The yoke is composed of the cross rod 250, the piston rod 244, two side rods 252 and 254 as well as a short piece of angle bar 256 which serves to join the piston rod 244 and side rods 252 and 254 in rigid relation. The rods 252 and 254 of the yoke are bent to extend outside of and parallel with the two side members 182 and 184 and their ends are pivoted to the latter at 260 and 262.

Thirteen endless belts 270 are mounted upon or guided by the rollers 124, 170, 210 and 180 and their upper runs contact or rest upon the plates 50, 54 and 192. Herein these belts are considered to be the lower endless conveyor belts and they are constrained by their guiding rollers to operate in an inverted V form, the spring mounted bar 110 resting upon the lower runs of the lower belts 270 to provide their requisite tautness. These lower runs are adapted to slide on the top surface of the plate 44. The upper runs of the belts 270 are so arranged as to run smoothly over the top surface of the plywood 50 and (in the absence of work) five of the belts 270 contact the lower runs of the five belts 144. It will be noted in Fig. 3 that the fingers 102 are disposed to operate between the belts (considered transversely of the machine) and that the fingers 90 and 92 are mounted just within two of the belts 144 in order to clear them.

Thirteen additional belts 271 are mounted on the machine and these are in spaced relation on the delivery arm 18 and are guided by rollers 170, 206, and 212 and also by the tensioning bar 196. When the arm 18 is positioned as in Fig. 1, the lower runs of the belts 271 rest upon the belts 270 assuming no work piece is interposed.

In the present drawings it is assumed that an endless conveyor belt 272 (Fig. 1) is provided on a machine from which the work pieces consecutively are presented to be stacked. This belt is so located as to terminate for work delivery just above the roller 124. It will be understood, however, that the work may be presented by hand or by a suitable chute. It will be noted that the roller 206 at the top of the machine is so placed with relation to the roller 170 that the leading edge of a given work piece H after that piece has been positively guided by the belts 270 and 144, is constrained to pass over the "hump" and is in no danger of being jammed.

Figure 12:
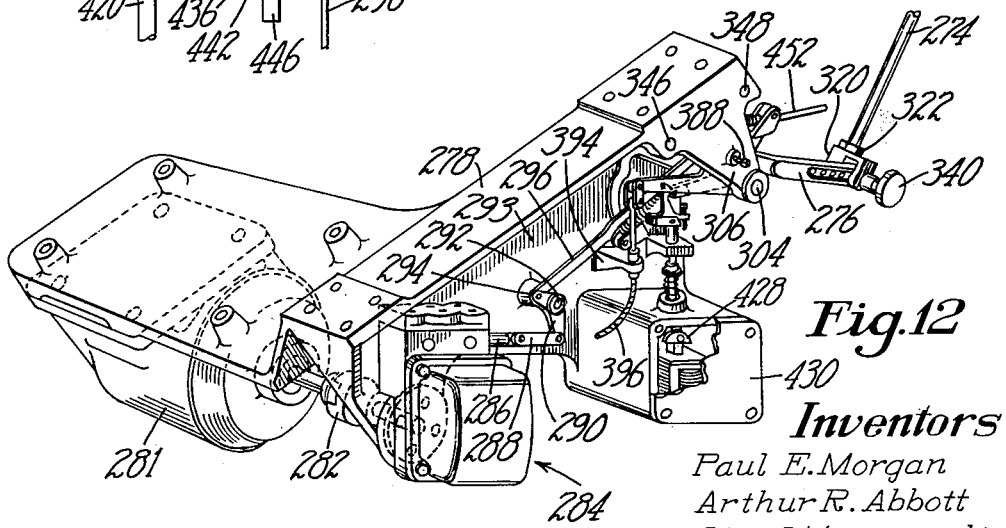
Fig. 12 is a perspective view of a motor driven control assembly shown in Figs. 1 and 2.

Just above the pivot point 262 (Fig. 2) on the side member 184 is pivoted one end of a bar 274, the lower end of which is mounted in adjustable and pivotal relation with an arm 276 which is a part of a control mechanism elements of which are illustrated in Fig. 12 in assembled relation.

A large bracket 278 is attached to the side member 42 by screws 279, two of which are shown in Figs. 13 and 14 and to the plate 44 by screws 280 (Figs. 2 and 3). The control mechanism includes the bracket 278 to the underside of which is mounted an electric motor 281 (Fig. 12) which is arranged to drive, through a universal coupling 282, a self-contained power pump unit 284 (Figs. 1 and 12). The power pump unit 284 is a commercial unit such as produced by Vickers Inc. of Detroit, Michigan. It includes as a unit a constant delivery pump, a relief valve, an oil reservoir or tank and a four-way valve. The four-way valve is operated by a plunger 286 the end of which is connected by a link 288 to one end of a bell crank member 290 which is pivoted at 292 to a depending flange 293 of the bracket 278. The bell crank member 290 is also in pivoted connection at 294 to the lower end of an arm 296 and the upper end of the latter is pivoted at 298 (Figs. 9, 10 and 11) to a pump control arm 300. The arm 300 is journaled on a shaft 302 passing through the flange 293. The shaft 302 has a head 304 and the headed end is supported in a depending portion 306 of the bracket 278. The pump control arm 300 is movable to three angular positions as shown by the broken lines A, B and C in Figs. 9, 10 and 11, and the valve plunger 286 of the power pump unit 284 is placed in the corresponding positions shown by the broken lines a, b and c in those figures. Fluid conduits 308 and 310 lead from the power pump unit 284 to the ends of the cylinder 242 and the arrangement is such that when the pump control arm 300 is in position B there is no fluid flow induced by the unit 284 to or from the cylinder 242. When the arm is in position A, the flow is as shown by the arrows in Fig. 10. When the arm is in the position C, the flow is as shown by the arrows in Fig. 11. Additional relief valves 312 and 314 are in lines connecting the two conduits 308 and 310 and serve to limit the acceleration and deceleration of swinging frame 18 as will further appear.

The connection between the rod 274 and arm 276 of the control mechanism has been heretofore described as being adjustable and details of the construction are clearly shown in Figs. 17 and 22. The rod 274 is threaded into a block 320 and locked in place by means of a nut 322. The block 320 is recessed or slotted to receive the arm 276 and is bored at 324 (Fig. 21) to receive a plunger 326, which is held in place by means of a coil spring 328 compressed between a screw-cap 330 and an angular flange 332, the latter being an integral part of the plunger 326. One end 334 of the plunger 326 is adapted to enter in any one of a number of holes 336 in the arm 276 and thereby determine the location of the pivot point. The plunger 326 is provided with a handle 340 which is pinned thereto.

As shown in Figs. 13 and 14 two opposed latches 342 and 344 are pivoted on pins 346 and 348 respectively passing through the depending flanges 293 and 306. The latch 342 is urged downwardly by a coil spring 350 and the latch 344 is urged downwardly by a spring 352. The latch 342 is also recessed at 354 to accommodate the end of the pump control arm 300 and is also provided with a beveled end surface 356. The end of the latch 344 is similarly provided with a recess 358 and a beveled surface 360. A pair of coaxial rollers 362 and 363 is mounted on the latch 342 and a similar pair of rollers 364 and 365 is mounted on the latch 344.

A stroke selecting cam 370 is shown journaled on the shaft 302. This cam 370 is omitted from Figs. 13 to 17 inclusive for the sake of clarity but is clearly disclosed in Figs. 18, 19, 20 and 22. It is in the shape of a segment having a curved cam surface 372 with two raised lands 374 and 376. The cam 370 is integral with a hub 378 (Fig. 22) to which is joined an arm 380. The arm 370 also carries a small block 382 having three detents corresponding with the positions A, B and C of the pump control arm 300. The detents are equidistant from the shaft 302. Cooperating with the detents of the block 382 is a spring pressed plunger 384 which is held in place by a nut 386 and bolt 388 as clearly shown in Fig. 22. The lands 374 and 376 of the cam 370 are such that when the cam 370 is positioned properly they then will coact with the rollers 363 or 365 to lift the corresponding latch 342 or 344. The end of the arm 380 which operates the stroke selecting cam 370 is connected to a vertical rod 390 by means of a linkage 392. The lower end of the rod 390 passes through a bracket 394 which extends from the flange 293 and is connected to a flexible cable 395 (Fig. 17) enclosed within a conduit 396. The enclosed cable 395 is preferably extended to convenient access by the operator controlling the stacker or the machine presenting work to the stacker.

Also mounted on the shaft 302 is a stroke starting cam 400 which has two lands 402 and 404 for cooperating with the rollers 362 and 364. The stroke starting cam 400 is also rigidly connected to an arm 406 on the bifurcated end of which is carried a pin 408. A coil spring 410 (Fig. 22) is connected to the end of the pin 408 and also to a pin 412 which protrudes from the depending flange 293. The spring 410 serves continually to urge the cam 400 in a clockwise direction as viewed in Fig. 14. A bracket 416 extends from the flange 293 and serves as a guide for a vertically slidable member 418 which is connected to the top of a solenoid rod 420. The element 418 is recessed at its top to accommodate a trigger member 422, the upper end of which is in the form of a hook for engaging the pin 408. The trigger member 422 is urged in a clockwise direction as viewed in Fig. 14 by a spring 424, and a bolt 426 is mounted on the trigger member in such a way that the depending end thereof is adapted to come in contact with the top of the bracket 416 to tilt the trigger member as will further appear. A stop member or bolt 427 is held by a bracket 429 (Fig. 22) extending from the flange 293. The bolt 427 is so placed as to limit the angular travel of the arm 406 and hence of the stroke starting cam 400.

The solenoid rod 420 extends downwardly and is connected with a plunger 428 (Fig. 12) of the solenoid located within the solenoid casing 430.

A stroke-reversing cam 432 (larger than the cams 370 or 400) having bifurcated portions 434 and 436 and connected to the arm 276 is also mounted to rotate on the shaft 302. The hubs of the cam 432 and the arm 276 are adapted to rotate together by means of a tongue-and-groove connection 437 (Fig. 22). The stroke-reversing cam 432 has a cam surface with two lands 438 and 440 for engaging the rollers 362 and 364. Rotatable blocks 442 and 444 are mounted in pivotal relation within the bifurcated portions 434 and 436 respectively. A rod 446 passes in slidable relation through the block 442 and an enlarged portion 451 thereof is pivoted at 448 to one side of the pump control arm 300. A coil spring 450 is placed around the rod 446 and is compressed between the block 442 and the enlarged portion 451 of the rod 446. A rod 452 is placed similarly and in slidable relation through the block 444 and is pivoted at 454 to the other side of the arm 300 and concentrically therewith is mounted a coil spring 456 which is compressed in a manner similar to that of spring 450.

One end 460 of the pump control arm 300 is arranged to abut one end of either of the latches 342 or 344 or to drop into either of the recesses 354 or 358 of those latches as Figures 13 to 18 inclusive illustrate.

A box 462 is arranged on the cast end member 14 (Figs. 1, 2 and 3) and this box includes much of the electronic control circuits diagrammatically illustrated in Fig. 23. This electronic control is herein described in its novel details but the specific elements thereof are conventional. The operation of the electrical circuits are further described in connection with the following description of the entire machine operation. Start and stop buttons 464 and 466 protrude from the box 462.

In Fig. 23 dot and dash lines are employed to block off the starting circuit for the two motors 136 and 281. It suffices to say insofar as the motor circuits are concerned that three phase alternating current is supplied through lines L and a main switch S leading to the motor starting circuits. Closing of the switch by pressing the button 464 actuates the motor contactor hold-in coil 470 and starts the two motors. It will be noted that in order to close the contactor circuit, the relay K5 must be closed and relay K5 is closed when any current is flowing, as the safety switch 220 at the end of the conveyor system is normally closed. The two motors 136 and 281 may be stopped by the manual opening of the switch at the button 466 or by the opening of the safety switch 220 when a stack of hides H reaches a height at which the top of the stack and the wire element 228 come into contact. In an emergency the switch 220 may be operated manually by means of the button 224. This switch is used to reconnect the circuit after wire element 228 has been struck (by over-height pile) or pulled (as safety precaution by man entering danger zone to remove horse, etc.).

T2 is a transformer which is adapted to receive current from a transformer T1 and it supplies current to the vacuum tubes V1 and V2 and other parts making up the control circuits.

Assuming that the motors 136 and 281 are running, then the endless belts 144, 270 and 271 are driven in the directions shown by the arrows in Fig. 1, the power being taken from the motor 136. The belts 144 are driven by the belt 130 as well as by contact with the belts 270. The belts 271 are driven through the action of the gears 214 and 216 and also by contact with the belts 270. With no work present on the conveyor system, the motor 281 merely drives the power pump unit 284 so that the oil therein is circulated within the unit (Fig. 9) with no flow through the conduits 308 and 310—i. e., the pump control arm 300 and the valve plunger 286 are in the positions B and b respectively. The stacker is then running with the endless conveyor belts in motion but with the delivery arm 18 stationary—i. e.—not swinging about the pivot pins 150 and 166. With no work being present, bias voltage from the selenium rectifier SR is applied to the condenser C1 through the normally closed contact K2a and the protecting resistor R6. With the condenser C1 fully charged there is a negative bias on the grid of the tube V1 preventing the flow of plate current through the tube. This holds the relay K4 (contact K4a) open and the solenoid plunger 428 stays up—i. e.—the stroke starting cam 400 is not pulled down.

Assuming that the machine is to stack consecutive hides H according to the "Marry" cycle as heretofore defined, the stroke selecting cam 370 is angularly positioned as shown in Fig. 13. The positioning is done by the operator by means of the cable 395 (Fig. 17) from a position convenient to him. There is no swinging motion of the conveyor system at this time and the delivery arm 18 is in the position shown in Fig. 1—that is—in its outward position.

A spread out work piece H is then presented to the bite between the belts 270 and 144 at the front of the machine and it is conveyed and positively guided by those belts upwardly and over the plywood 50 thereby tripping the switch 96 to close the relay K1 and opening the contact K2a of the relay K2. Removal of the bias voltage from the condenser C1 causes the latter to begin to discharge through the resistor R9, variable resistor P3, and if relay K3 has been closed by tripping of the switch 105, to the ground, or if switch 105 is not tripped, through the contact K3a to the ground.

As heretofore referred to, the arrangement of the roller 266 with respect to the roller 170 is such that each work piece does not meet the belts 271 at such an abrupt angle that jamming is apt to occur. The belts 271 and 270, at the top of the machine, present a bite to grasp the leading edge of each work piece and positively guide it over the "hump."

The discharge of the condenser C1 causes the tube V1 to conduct thereby closing the relay contact K4a. This causes the solenoid to pull down the hook 422 thereby rotating the stroke-starting cam 400 in a counterclockwise direction from its position as shown in Fig. 13 to that of Fig. 14. This causes the land 402 to lift the latch 342 through the roller 362 and the spring 456 throws the pump control arm 300 to the left into the position A with the arm end 460 locked within the latch recess 354. Immediately the pump unit 284 serves to move the piston 246 to the left and the work discharge end of the delivery system swings inwardly as shown in Fig. 10.

It will be appreciated that if the pump unit 284 were to deliver a constant amount of oil per second that the consequent action on the cylinder 242 would place a strain on the parts and possibly cause damage. As heretofore referred to, the relief valves 312 and 314 (Fig. 10) limit the acceleration and deceleration of the swinging frame 18. They do this by by-passing some of the oil flow and smooth operation results.

During the final portion of the downward movement of the solenoid, the hook 422 becomes disengaged from the pin 408 because of the action of the bolt 426, and the stroke-starting cam 400 is caused to return to its normal position (that of Figs. 13, 15 and 17) by action of the spring 410.

When the delivery arm 18 nears the end of its inward stroke, the rod 274 is effective, through the arm 276, to rotate the stroke-reversing cam 432 clockwise (Fig. 16). The land 438, in Fig. 16, is about to contact the roller 362 and when it does (Fig. 17), the latch 342 is lifted and the spring 450 is enabled to return the pump control arm 300 to its position B as shown in Figs. 9 and 17. At this stage the inward swinging stroke of the delivery arm 18 terminates and the next work piece H is awaited by the stacker. The inward swing of the arm 18 places the given work piece on the horse 10.

When the next work piece trips the switch 96, the solenoid pulls the hook 422 down but this time the land 404 on the cam 400 lifts the latch 344 causing the spring 450 to throw the arm 300 into its position C (Figs. 11 and 18). The arm 18 is then swung outwardly by action of the power pump and that particular work piece is deposited on the horse 10 in flesh-to-flesh or grain-to-grain relationship with the prior piece. At the end of the outward stroke of the arm 18 the swinging action is again stopped by the action of the stroke-reversing cam 432 and the machine is ready to begin another marry cycle as illustrated in Figs. 13 to 17.

The discharge of the condenser C1 also causes the relay contact K4b to open which opens the supply voltage to the relays K1, K2, K3 and K4. The latter are then opened, if closed, for the subsequent cycle. The closing of the contact K2a recharges the condenser C1, which prevents the tube V1 from conducting. The resistor R5 and the condenser C2 serve to create a time delay permitting the operated device or solenoid time to operate and to allow the condenser C1 to recharge.

The function of the relay K1 is to supply the condenser C1 with bias current, adjusted by a variable resistor P1, proportional to one half of the speed of the belts 270. The relay K1 is closed only during the time a given hide is under the feeler switch 96 or under both switches 96 and 105. This, in effect, makes the circuit sensitive to the length of each work piece.

Line "X" in Fig. 3 represents the necessary line which the center of any work piece must reach so that a subsequent belt travel and swing of the end of the discharge system will place the center of that work piece over the center line of the horse 10 receiving the work. This line is the same for any length of work piece and all machine timing is predicated upon the work piece center being on that line when the delivery arm 18 starts to swing.

If all work pieces were to travel at the same speed as the stacker belts 270 upon entry, then a simple delay set-up employing the single detector switch 96 would be satisfactory. Such a set-up would involve a delay proportional to travel time of the belts 270 from the point of detection to the line X plus one half the time required for the work piece to pass under the detection points. This set-up is not satisfactory when long work pieces are being stacked because a long hide emerging from a machine which has discharged that hide at a given speed would continue traveling at that speed under the switch 96 and not at the lesser speed of the belts 270. This would necessitate moving the switch 96 (actually, of course, the work contacting portions of the fingers 92) far enough up the stacker slope that the long hide would be clear of the discharging machine before the leading edge of the hide enters under the detectors—but in such a case the detecting points are so near to the line X that the center of the hide would pass the line X by the time the trailing edge passes the detectors—and the center of the hide would be deposited beyond the center of the horse 10. The switch 105 is therefore needed to initiate a time delay before a long work piece center passes the line X.

In the arrangement shown in the drawings, the switch 105 is not necessary for short work pieces—that is, shorter than the distance Y (Fig. 1) between work detectors at that switch would open again before such a work piece passes under the detector of switch 92.

With a short skin passing under the switch detector 92 it closes the switch 96, causing the relays K1 and K2 to close. K2 remains closed by virtue of its hold-in contacts K2c, and K1 remains closed as long as there is a skin under the detector 92 of switch 96. Bias current is supplied to the condenser C1 from the selenium rectifier SR through closed contacts on K1, through the variable resistor P1, resistors R6 and R7. The resistance network P1, R7 and R6 is adjusted so that the rate of this current flow into C1 is proportional to one-half the work piece speed as it travels up the stacker slope. Simultaneously with this flow into C1 there is a drain out through the resistance network R9 and P2 to ground. As the skin emerges from beneath the detectors 92 and the switch 96 opens halting the flow into C1. The time required on the net charge remaining on C1 to drain off through R9 and P1 corresponds to the interval of time required for the center of the work piece to reach the line X. When this occurs the tube V1 fires and initiates operation of the stacker by activating the solenoid.

When a work piece is of greater length than the distance

Y of Fig. 1, the switch 96 is first closed so that contactors K1 and K2 close. The contactor K3 also closed as the switch 105 and the contactor K2 became closed at the same time. The condenser C1 drain circuit then passes through the variable resistor P3 as well as R9 and P2 to ground. The added time delay is proportional to the resistance of P3. As the long work piece trailing edge leaves the detectors 102 the switch 105 opens and the contactor K1 opens. The net charge on the condenser C1 drains off, the tube V1 fires, and a swing of the delivery arm 18 begins.

With long work pieces, the following three factors are involved:

1. The delay time of discharge of the fully charged condenser C1 through P2 corresponds to the travel time of the belts 270 from the detector 92 to the line X.

2. The additional resistance of P3 increases the delay time corresponding to the belt travel time from the detector 102 to the detector 92.

3. The fed in charge through P1, R7, R6, as long as a work piece is under detectors 102 and 96, is proportional to one-half the time required for the work piece to pass those detectors.

In preparing the stacker for "Standard" stacking as heretofore defined, the control cams 432 and 400 are positioned as shown in Fig. 13 but in the case of "Standard" stacking the stroke selecting cam 370, as shown in Fig. 20 (and with the arm 18 positioned outwardly as in Fig. 1) is rotated clockwise by means of the cable 395 (Fig. 17), rod 390 and linkage 392. This causes the land 374 to lift the latch 342 and the pump control arm is swung into its annular position A by action of the spring 456 as such swinging occurs in the operation of the parts shown in Figs. 13 and 14. The "Standard" stacking cam operation continues as in Figs. 15 and 16 and is similar to that previously described with relation to the "Marry" cycle. However, when the arm 18 has reached its inner position as in Fig. 11, the latch 344 is held up by the stroke selector cam 370 so that the spring 450 is enabled to throw the arm 300 from its position A (Fig. 10) directly to its position C (Figs. 11 and 19) reversing the pumping action and hence the direction of swing of the arm 18. When the arm 18 reaches its original starting (outer) position, then the land 440 of the reversing cam 432 lifts the latch 344 and the arm 300 is swung into its position B (Figs. 9 and 20) and the arm 18 terminates its swinging motion. The discharge end of the delivery system is therefore swung inwardly discharging a work piece and then outwardly with no work being discharged and that work piece is placed on the horse 10 with the same side up as received.

With "Invert" stacking the operation is the same as in the case of "Standard" stacking except that it is reversed—i. e.—the pump control arm 300 is shifted from the position C (Figs. 18 and 11) to position A (Figs. 16 and 10) and back to position C. The arm 18 is therefore swung outwardly and then inwardly and the work piece as discharged during the outward stroke is inverted—i. e.—if a hide is received with its grain side up it is deposited with the flesh side up.

With long work pieces, the "Doubled" stacking procedure is carried out by alternating the "Standard" and "Invert" form of stacking with each work piece being discharged during both inward and outward strokes of the arm 18. A number of long hides are first stacked using the "Standard" method to place all the looped portions of those hides on one side of the stack and then the next group of hides are stacked using the "Invert" method to place their looped portions on the other side of the stack. This procedure balances the stack.

The adjustment feature of Fig. 21 is important as it is an effective means for reducing or increasing the range of swing of the arm 18 in discharging the work. There would be no point in having a large swing of the arm for small work pieces and possibly encountering difficulties with air problems in properly depositing the work. An unnecessarily large swing would also cause the stacker to be less efficient in so far as time is concerned. The adjustment is also advantageous in the event that the stack thickness in a horizontal direction is varied considerably. A thicker stack would require a longer swing.

The variable resistor P2 is provided to furnish means for varying the voltage potential at which the tube V1 fires. In this manner not only are means provided for enabling accurate adjustment of the timing device but also the variable resistor P2 provides means for varying the theoretical line X referred to above. Thus the timed relationship between the oscillation of the arm 18 and the passage of the midportion of a work piece may be varied. In this manner it is possible accurately to place different types of leather on the horse H by properly accounting for the differences in weight, flexibility etc., which affect the manner of deposition of work pieces. As was pointed out above, it is also necessary or desirable to vary the angle of oscillation of the arm 18 when different types of leather are being stacked. When this is done, it also affects the timed relationship for oscillating the arm correctly to place work pieces on the horse H. For this further reason the variable resistor P2 is provided to accommodate such adjustments in the angle of oscillation from type of leather to type of leather.

Having fully described our invention, what we claim as new and desire to secure by Letters Patent of the United States is:

1. A stacking machine for sheet material workpieces introduced at random having, in combination, a main frame, a delivery arm pivotally connected thereto, a conveyor system adapted to convey workpieces along said frame and discharge them from said delivery arm, power means for oscillating said arm first in one direction and then in the other through a predetermined angle of oscillation, means for varying said angle of oscillation, detector means in said conveyor system which are responsive to the passage of a workpiece, and control means operative in response to said detector means for actuating said power means.

2. A stacking machine for hides and skins introduced at random, having in combination, a main frame, a delivery arm pivotally connected thereto, a conveyor system adapted to convey workpieces along said main frame and discharge them from said delivery arm, power means for oscillating said arm first in one direction and then in the other through a predetermined angle of oscillation, displaceable means for controlling said power means, detector means in said conveyor system which are responsive to the passage of a workpiece, means actuated by said detector means for displacing said control means to initiate the action of said power means, and a second means for causing the control means to terminate the action of said power means, said second means being operatively connected to said delivery arm whereby the termination of the power means is controlled by the position of the delivery arm.

3. A stacking machine for hides and skins introduced at random, having in combination, a main frame, a delivery arm pivotally connected thereto, a conveyor system adapted to convey workpieces along said frame and discharge them from said delivery arm, power means for oscillating said arm first in one direction and then in the other through a predetermined angle of oscillation in cyclic operation, displaceable means for controlling said power means, detector means in said conveyor system which are responsive to the passage of a workpiece, means actuated by said detector means for displacing said control means to initiate the action of said power means, a second means operatively connected to said delivery arm for terminating the action of said power means, whereby the termination of the power means is dependent upon the position of said delivery arm, and means for varying the relationship of said second means to said delivery arm to vary the angle of oscillation of said arm.

4. A stacking machine for hides and skins introduced at random, having in combination, a main frame, a delivery arm pivotally connected thereto, a conveyor system adapted to convey workpieces along said frame and discharge them from said delivery arm, power means for oscillating said arm first in one direction and then in the other through a predetermined angle of oscillation in cyclic operation, displaceable control means for said power means, a yieldably mounted operating arm connected to said control means, means for maintaining said operating arm and said control means in a neutral position, detector means in said conveyor system which are responsive to the passage of a workpiece, cam means for removing the obstruction to said operating arm and permitting it to be displaced, means operative in response to the detector means for actuating said cam means, means for maintaining the operating arm in its displaced position whereby the power means cause the delivery arm to be oscillated, a second cam means for releasing said operating arm, further spring means for reversing the direction of displacement of said operating arm, a link operatively connecting said second cam means and said delivery arm whereby when said delivery arm has moved through a predetermined angle of oscillation said second cam means becomes effective and the operating arm and control means are returned to their neutral position through the action of said further spring means.

5. The apparatus of claim 4 wherein means are provided for retaining the operating arm in another operating position so that the power means oscillate the delivery arm in the other direction, a control cam which permits the operating arm to be displaced by said further spring means to said other operating position so that the control means cause the power means to swing the delivery arm in the other direction of oscillation whereby a single sensing by the detector station causes the delivery arm to be oscillated in first one direction and then the other in cyclic operation.

6. A stacking machine for hides and skins introduced at random having a main frame, a delivery arm pivotally connected thereto, a conveyor system adapted to convey workpieces along said frame and discharge them from said delivery arm, power means for oscillating said arm first in one direction and then in the other through a predetermined angle of oscillation, detector means in said conveyor system which are responsive to the passage of a workpiece, control means having a neutral and two operating positions for causing the power means to swing said delivery arm in a desired direction, a control unit for determining the position of said control means to obtain a predetermined cycle of operation of said power means, said unit comprising a control arm operatively connected to the control means of said power means, the position of said control means being responsive to displacement of said arm, a spring means adapted to displace said control arm in one direction, a second spring means adapted to displace said control arm in the other direction, two latches each of which has three operative positions, a first position which prevents displacement of said control arm, a second position which allows said control arm to be displaced and retained in a notch formed in the respective latch, and a third position which allows said arm to be moved clear of said retaining notch, at least one of said latches being in its first position in the rest condition of said control unit, a starting cam for bringing said latches into their second positions, means operative in response to the sensing of said detector means for moving said starting cam thereby bringing each latch into its second position and permitting said control arm to be displaced by one of said spring means and retained in its displaced position by said retaining notch, the displacement of said control arm causing actuation of the power means and oscillation of said delivery arm, a stroke reversing cam adapted alternately to displace each of said latches to its third position, a control link operatively connected between said delivery arm and said reversing cam for causing the reversing cam to displace the latch retaining said control arm to its third position as the delivery arm approaches the end of its predetermined stroke, means for varying the ratio of movement of said reversing cam to the movement of said delivery arm whereby the angle of oscillation of the delivery arm may be varied, means responsive to the movement of said delivery arm for causing the other of said spring means to urge the control arm in the opposite direction whereby when said control arm is released from the retaining notch in said link by the action of the stroke reversing cam, the control arm moves in the opposite direction, and a stroke control cam adjustably arranged to determine the operating positions which the latches assume thereby determining the cycle of operation of said power means and said delivery arm.

7. A stacking machine for sheet material workpieces introduced at random having a main frame, a delivery arm pivotally connected thereto, a conveyor system adapted to convey workpieces along said frame and discharge them from said delivery arm, power means for driving said conveyor system, means for oscillating said arm first in one direction and then in the other through a predetermined angle of oscillation, a switch arranged to control said power means and contacting means mounted on the discharge end of said delivery arm for detecting obstructions to the movement of said delivery arm, such as a built up stack of workpieces, said contacting means being operatively connected to said switch in such a manner that when an obstruction is contacted the contacting means actuates the switch to deactivate said power means thereby immediately stopping the operation of the conveyor system.

8. The apparatus of claim 7 wherein the contacting means comprises a wire stretched across the lower end of the delivery arm, said wire being arranged to open said switch to cause the deactivation of the power means.

9. A stacking machine for sheet material work pieces introduced at random having a fixed main frame inclined upwardly, a delivery arm pivotally connected to the upper end of said main frame at a pivot point, means for oscillating said delivery arm through a predetermined angle above a work receiving zone, a main conveyor having a first run extending upwardly along said frame and around a roll concentric with said pivot point and a second run extending downwardly along said delivery arm, a delivery arm conveyor having a run the lower portion of which is parallel to and contiguous with the second run of said main conveyor, and the upper portion of which extends above the plane of the first run of said main conveyor and is arranged to form an acute angle with said plane at all times when said arm is oscillated through said predetermined angle, means for oscillating said delivery arm about said pivot point, and means operative in response to the passage of a work piece for actuating said delivery arm oscillating means so that each work piece will be properly disposed in said zone.

10. A stacking machine for sheet material work pieces introduced at random having a main frame, a delivery arm pivotally connected thereto, a conveyor system adapted to convey work pieces along said frame and discharge them from said delivery arm, power means for moving said arm first in one direction and then in the opposite direction through a predetermined angle of oscillation in cyclic operation, a detector means in said conveyor system which is responsive to the passage of a work piece, a timing device actuated by said detector station and responsive to the length of said work piece which actuates said power means in a predetermined time relationship to the passage of the midportion of the work piece, and means for varying said predetermined time relationship whereby said delivery arm may be oscillated when the midportion of the work piece has advanced to a desired point in the conveyor system dependent upon the particular type of sheet material being stacked.

11. A stacking machine for sheet material work pieces introduced at random having a main frame, a delivery arm pivotally connected thereto, a conveyor system adapted to convey work pieces along said frame and discharge them from said delivery arm, power means for moving said arm first in one direction and then in the opposite direction through a predetermined angle of oscillation in cyclic operation, means for varying said angle of oscillation, a detector means in said conveyor system which is responsive to the passage of a work piece, a timing device actuated by said detector station and responsive to the length of said work piece which actuates said power means in a predetermined time relationship to the passage of the midportion of the work piece, and means for varying said predetermined time relationship whereby said delivery arm may be oscillated when the midportion of the work piece has advanced to a desired point in the conveyor system dependent upon the particular type of sheet material being stacked.

12. A stacking machine for hides and skins introduced at random, having a main frame, a delivery arm pivotally connected thereto, a conveyor system adapted to convey work pieces along said frame and discharge them from said delivery arm, power means for moving said arm first in one direction and then in the opposite direction through a predetermined angle of oscillation, a detector station in said conveyor system which is responsive to the passage of a work piece, a timing device for causing the actuation of said power means, said timing device comprising an electronic tube, a voltage potential adapted to control passage of current through said tube, means for varying said voltage potential at a first rate, a second means for varying said potential at twice the first rate, said first means being operative so long as a work piece is beneath said detector station, said second means being operative after each work piece passes beneath said second means to continue the variation of said voltage potential, means operative in response to passage of current through the electronic tube for actuating said power means whereby when said voltage potential has been varied to a predetermined value current flows through said electronic tube and the delivery arm is thereby oscillated in proper time relationship to the passage of the midportion of a work piece, and adjustable means for predetermining the voltage potential at which current will pass through said electronic tube whereby said predetermined relationship may be correctly established for various types of hides and skins.

References Cited in the file of this patent

UNITED STATES PATENTS

| | | |
|---|---|---|
| 25,524 | Potter | Sept. 20, 1859 |
| 2,250,572 | Cumfer | July 29, 1941 |
| 2,263,441 | Lewis | Nov. 18, 1941 |
| 2,355,105 | Preston | Aug. 8, 1944 |
| 2,403,394 | Preston | July 2, 1946 |
| 2,487,150 | Lexa | Nov. 8, 1949 |
| 2,533,184 | Trump | Dec. 5, 1950 |
| 2,533,369 | Hartwig | Dec. 12, 1950 |
| 2,572,472 | Griffin | Oct. 23, 1951 |

FOREIGN PATENTS

| | | |
|---|---|---|
| 852,898 | France | Mar. 5, 1940 |